(12) United States Patent
Koutoupis

(10) Patent No.: US 10,223,203 B2
(45) Date of Patent: Mar. 5, 2019

(54) SYSTEMS AND METHODS FOR MANAGING DIGITAL DATA IN A FAULT TOLERANT MATRIX

(71) Applicant: Petros Koutoupis, Carol Stream, IL (US)

(72) Inventor: Petros Koutoupis, Carol Stream, IL (US)

( * ) Notice: Subject to any disclaimer, the term of this patent is extended or adjusted under 35 U.S.C. 154(b) by 0 days.

(21) Appl. No.: 15/017,253

(22) Filed: Feb. 5, 2016

(65) Prior Publication Data

US 2017/0228286 A1 Aug. 10, 2017

(51) Int. Cl.
  *G06F 11/00* (2006.01)
  *G06F 11/10* (2006.01)
(52) U.S. Cl.
  CPC .... *G06F 11/1084* (2013.01); *G06F 2211/109* (2013.01); *G06F 2211/1011* (2013.01)

(58) Field of Classification Search
  USPC ........................................................ 714/6.24
  See application file for complete search history.

(56) References Cited

U.S. PATENT DOCUMENTS

2010/0218037 A1* 8/2010 Swartz ................... G06F 17/30
                                              714/6.12

* cited by examiner

*Primary Examiner* — Sarai E Butler
(74) *Attorney, Agent, or Firm* — K&L Gates LLP

(57) ABSTRACT

Aspects of the present disclosure relate to systems and methods for automatic management of digital data volumes logically maintained in a dynamically scalable fault tolerant matrix. The data volumes may be distributed across a cluster of connected server nodes included in a cloud computing architecture. A processing device in communication with the matrix ensure that read/write request may be serviced by the matrix to access the digital data maintained within the data volumes may be continuously accessed, regardless of data volume failure that are missing, offline, or in a failed state.

18 Claims, 3 Drawing Sheets

SYSTEMS AND METHODS FOR MANAGING DIGITAL DATA IN A FAULT TOLERANT MATRIX

TECHNICAL FIELD

Aspects of the present disclosure relate to distributed storage mechanisms and devices, and in particular, systems and methods for establishing redundancy and fault tolerance among such distributed storage mechanisms and devices.

BACKGROUND

Many data storage environments combine virtualization technologies with fault tolerant deign patterns to ensure that the storage environments are able to continue operating properly in the event of a system failure, such as for example when one or more storage devices of the storage environment become unavailable. For example, Redundant Array of Inexpensive Disks, commonly referred to as "RAID" is a virtualization technology used to mitigate the impact of storage device failure. More specifically, RAID provides a way of storing the same data in different places (i.e., redundantly) on multiple storage disks, so that in the event of a failure of a single disk, the data may still be accessible. Maintaining and/or scaling RAID technologies, however, can be time-consuming, expensive, and labor-intensive.

It is with these concepts in mind, among others, that various aspects of the present disclosure were conceived.

SUMMARY

Aspects of the present disclosure include methods, systems, and computer-readable mediums for generating a fault tolerant matrix. The methods, systems, and computer-readable mediums include a cluster of computing nodes distributed throughout a communications network, respective computing nodes of the cluster of computing nodes maintaining a plurality of data volumes logically arranged in a matrix. The methods, systems, and computer-readable mediums further include a processing device in operable communication with at least one computing node of the cluster of computing nodes to: receive a request requesting access to data stored in a particular data volume of the plurality of data volumes arranged in the matrix and determine whether the matrix is degraded. The processing device is further configured to when the data volume is degraded, execute erasure coding algorithms to regenerate the data, based on a row of the matrix in which the data volume is maintained.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. Also, in the drawings the like reference characters refer to the same parts throughout the different views. The drawings depict only typical embodiments of the present disclosure and, therefore, are not to be considered limiting in scope.

DETAILED DESCRIPTION

Figure 1:
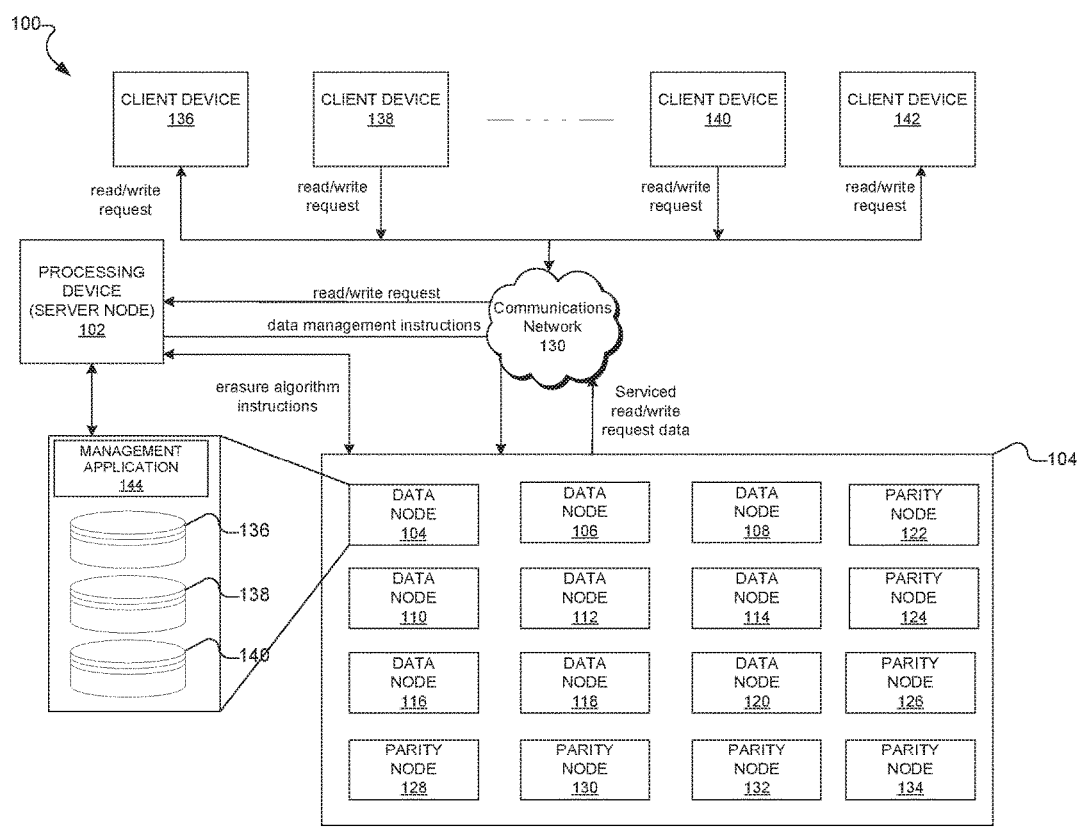
FIG. 1 is a block diagram illustrating a computing architecture for managing digital data maintained in a matrix, according to aspects of the present disclosure.

Aspects of the present disclosure relate to systems and methods for managing digital data (or any data) in a fault tolerant matrix. In various aspects, one or more data volumes distributed across multiple networks, machines, and/or other data constructs may be assembled or otherwise maintained within a single logical unit, such as an "n×n" or "m×n" matrix. In various aspects, the matrix may be implemented according to a fault-tolerant design pattern to ensure that any read and/or write requests issued to the one or more of the disk volumes logically arranged within the matrix may be successfully serviced, even in the event of a failure. Stated differently, the fault-tolerant design of the system ensures all read/write request will be serviced and any data maintained in the matrix can continuously be accessed, even if there is a failure of one or more of the data volumes maintained within the fault tolerant matrix.

In other aspects, logically arranging the data volumes as a matrix allows for automatic and efficient scalability. More specifically, as the number of data volumes included within the matrix expand, the ratio between the number of data volumes and a number of parity drives may also expand, thereby reducing the cost and requirement for redundancy between the data volumes. For example, in a typical RAID environment, such as a RAID of level 1 or 10, as the RAID grows, so does the cost associated with establishing and maintaining redundancy within the RAID. To enable redundancy and ensure fault tolerance, RAIDs of level 1 and/or 10 require double the amount of data volume drives at all times, effectively increasing the cost required to maintain data. Stated differently, the RAID system and/or architectures must be large enough to support two-times the amount of total data (Total Data*2); the original data and a copy of the data in the event of a failure. And if there is no RAID tiering (i.e. other RAID levels underneath the mirror), such RAIDs can only sustain a single drive failure.

RAID levels 3, 4 and 5 may grow to multiple data volumes and the cost for such RAID levels may be low for operational purposes, but such RAID levels can only sustain a single drive failure. Moreover, such RAID levels may only sacrifice a single data volume's worth of capacity to calculate parity data. Growing the RAIDs will constantly put a system at risk for drive failures. RAID 6 is essentially RAID 5 but can only sustain up 2 failures, sacrificing two disks instead of one. The risk when growing a RAID 6 is the same as RAID levels 3, 4 & 5.

Typical data centers tier multiple RAID levels when implementing fault tolerance. For example, a typical data center may mirror (RAID 1) 2 sets of RAID 6. In such an example, assume that 8 drives are used in each RAID 6 array, wherein one set is mirrored to the other.

| Set 1 | Set 2 |
|---|---|
| Data (O) | Data (M) |
| Data (O) | Data (M) |
| Data (O) | Data (M) |
| Data (O) | Data (M) |
| Data (O) | Data (M) |
| Data (O) | Data (M) |
| Parity (O) | Parity (M) |
| Parity (O) | Parity (M) |

The (O) stands for original while the (M) stands for mirrored. In the above scenario, to maintain 6 drives worth of data and ensure up to 3 (at most) volume failures, ten (10) drives are sacrificed for redundancy, which is expensive to configure and maintain.

Aspects of the present disclosure allow the matrix to dynamically grow while reducing the amount of required redundancy (e.g., parity support). More specifically, as the matrix grows or increases in size, the data volumes require less parity volumes to maintain, at an (m+n−1) amount of volumes for parity. Note that the previous equation only applies to single column parity. If m=4 and n=3, 6 data volumes and 6 parity volumes will be maintained and no more than six (6) failures can occur. However, if the matrix increased in size to m=5 and n=5, there would be 16 data volumes and 9 parity volumes and no more than nine (9) failures can occur. If the matrix further grows the matrix to have m=8 and n=7. 42 data volumes and 14 parity data volumes capable of taking 14 failures. Although the above example refers to a single column parity, it is contemplated that any number of column parity may be applied, such as a double column parity using the equation (m+(n*2)−2).

FIG. 1 illustrates a computing architecture 100 capable of managing digital data (or any data) in a fault tolerant matrix, according to one embodiment. As illustrated, the computing architecture 100 includes a processing device 102 (e.g., a server node) capable of managing data transmitted to and from an "n×n" or "m×n" matrix 104 logically containing a cluster of nodes distributed throughout and/or otherwise accessible (i.e., networked) via a communications network 130 (e.g., a cloud computing arrangement), which may be an IP-based telecommunications network, the Internet, an intranet, a local area network, a wireless local network, a content distribution network, or any other type of communications network, as well as combinations of networks.

The server data nodes 104-120 each contain one or more data volumes (illustrated at 136, 138, and 140), either physical or virtual. In some embodiments, the data volumes within each of the server data nodes 104-134 may be represented as a single virtual volume. Thus, in the illustrated embodiment, data volumes 136, 138, and 140 may be maintained within a data node as a single virtual data volume. For example, various Redundant Array Of Inexpensive Disks ("RAID") mechanisms may be employed to virtualize the data volumes into a single volume. Such RAID mechanisms include enabling a RAID mirror, a RAID stripe, a linear concatenation, among others.

The matrix 104 also includes a plurality of parity server nodes 122-134 containing parity data volumes that allows the processing device 102 to automatically rebuild portions of the matrix 104 in the event of a data node failure (e.g., failure of one of the server data nodes 104-120). Generally speaking, parity represents a mechanism that provides fault tolerance. To generate parity data for storage at the parity nodes 122-134, a single data bit (or other information) is added to the end of a requested (read and/or write) data block to ensure the number of bits in the request is either odd or even. For example, if even parity is used, the processing device 102 managing the matrix 104 will know that every correct message must contain an even number of bits; otherwise, there has been an error and the source device (e.g., one of the client devices 136-142) must resend the request.

In the illustrated embodiment, the parity may be applied or otherwise enforced horizontally and/or vertically. More specifically, in a vertical parity arrangement, bits of data blocks stored in data volumes of server data nodes in each column are generated and stored. So for example in the illustrated embodiment, parity data may be generated for the first column of data blocks of the matrix 104, including server data nodes 104, 110, and 116. The parity data may be stored in the parity node 128 of the matrix 104. As another example, parity data may be generated for the third column of data blocks of the matrix 104, including the server data nodes 106, 112, and 118. The parity data may then be stored in the parity node 132. Vertical parity may be applied to any column of the matrix 104.

In a horizontal arrangement, bits of data blocks stored in data volumes of data nodes in each row are generated and stored. Thus, in the illustrated embodiment, parity data may be generated for the first row of data blocks of the matrix 104, including server data nodes 104-108. The parity data may be stored in the parity node 122 of the matrix 104. As another example, parity data may be generated for the second row of data blocks of the matrix 104, including the server data nodes 110-114. The parity data may them be stored in the parity node 124. Horizontal parity may be applied to any row of the matrix 104.

An illustrative example of generating parity data according to a horizontal approach and subsequently using the parity data to reconstruct data maintained within failed data volumes will now be provided. As an example A, assume the following data volumes, "D#" have the following bit data:

| D4: 1001 | D5: 1101 | D6: 0010 | $P_{row}2$: 0110 |

Example A

Using a bitwise Exclusive-OR ("XOR") formula, the parity for the row is calculated to be 0110. More specifically, the parity may be calculated using the following equation: $P=(D_0 \oplus D_1 \oplus D_2 \oplus \ldots \oplus D_{n-1})$, wherein "$\oplus$" signifies a bitwise XOR operator; P signifies the Parity; and D represents the Data to be used for Parity calculation.

If data volume 5 ("D5") were to disappear or otherwise fail, the data could be regenerated using a Data Regeneration Calculation equation, $D_2=(D_0 \oplus D_1 \oplus P)$, wherein "$\oplus$" signifies a bitwise XOR (Exclusive OR) operator; P signifies the Parity; and D represents the Data to be used for Parity calculation. Applying the Data Regeneration Calculation to Example A above, would result in $(1001 \oplus 0010 \oplus 0110)= 1101$.

Assume now that the matrix is healthy and data in data volume D5 was updated to 1000 due to a write request. A Data Update Calculation equation, $A=((D_0 \oplus D_0') \oplus P)$ could be used to update the data on volume 5 to 1000. Accordingly, the Data Update Calculation equation would give us a new parity: $(1101 \oplus 1000) \oplus 0110)=0011$, wherein "$\oplus$" signifies a bitwise XOR (Exclusive OR) operator; P signifies the Parity; and D represents the Data to be used for Parity calculation, including $D_0'$ which represents the updated data value. The newly updated data may be validated by running the entire row through a parity calculation: $1001 \oplus 1000 \oplus 0010 = 0011$, which is equivalent to the value calculated using the Data Update Calculation equation.

Although Example A explained above refers to horizontal parity, parity data may be obtained and maintained vertically (i.e., applied to columns of the matrix) using the same or similar algorithms. And in some embodiments, application of a vertical parity approach enables recalculation of multiple row volume failures. Using Example A as a reference, if volumes D5 and D6 were to fail, horizontal (i.e. row based) reconstruction wouldn't be able to regenerate the missing data. Thus, vertical (i.e., column based) parity and reconstruction should be applied. Thus, multiple failures may occur on an entire row and/or entire column, while still being able to service the data requested. If no failures are present, the matrix is healthy. If one or more failures occur and the matrix is still active, it is considered degraded. Generally speaking, when the matrix experiences the failure of one or more data volumes, it may enter a degraded mode that allows the continued usage of the matrix, but experiences performance penalties due to the necessity to reconstruct the damaged data (e.g., via parity drives). The matrix is considered degraded because one or more of the data volumes is broken or has failed and data is no longer accessible. If the failures reach the matrix's threshold, then it is considered failed. The above equations are just examples of erasure coding algorithms and it is contemplated that others may be applied.

Referring generally again to FIG. 1, the size and capacity of the matrix 104 may be dynamically and automatically expanded by the processing device 102, as long as the matrix abides by the n×n or m×n guidelines. More specifically, as explained above, the server data nodes 104-120 are assembled into a matrix of n×n or m×n:

$$A = \begin{bmatrix} a_{11} & a_{12} & a_{13} \\ a_{21} & a_{22} & a_{23} \\ a_{31} & a_{32} & a_{33} \end{bmatrix}$$

FIG. 1: Example of an $n \times n$ matrix.

$$A = \begin{bmatrix} a_{11} & a_{12} & a_{13} & a_{14} \\ a_{21} & a_{22} & a_{23} & a_{24} \\ a_{31} & a_{32} & a_{33} & a_{34} \end{bmatrix}$$

Figure 2:
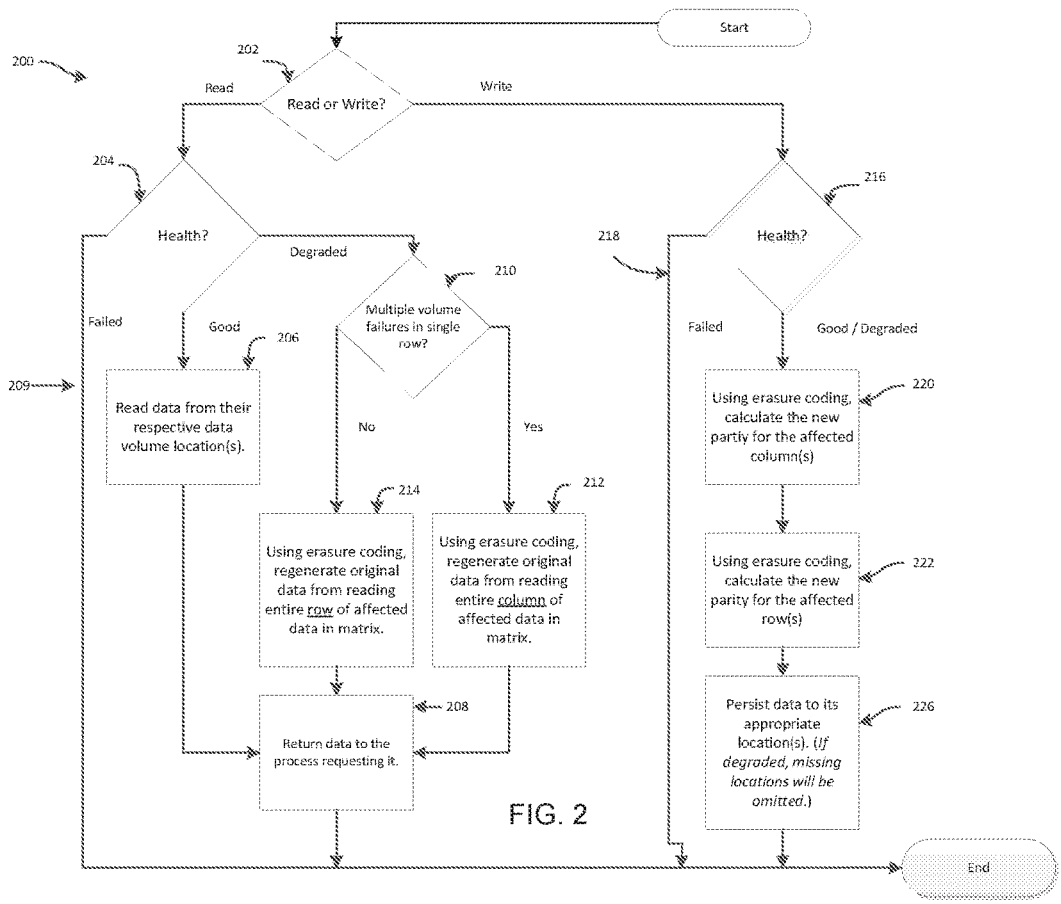
FIG. 2 is a flowchart illustrating an example process for managing digital data maintained in a matrix, according to aspects of the present disclosure.

FIG. 2: Example of an $m \times n$ matrix.

Using one or more of the algorithms described above, parities are kept for each the total number of rows minus 1 or more and again for the total number of columns:

$$A = \begin{bmatrix} d_1 & d_2 & d_3 & p_{r1} \\ d_4 & d_5 & d_6 & p_{r2} \\ d_7 & d_8 & d_9 & p_{r3} \\ p_{c1} & p_{c2} & p_{c3} & p_{c4} \end{bmatrix}$$

Figure 3:
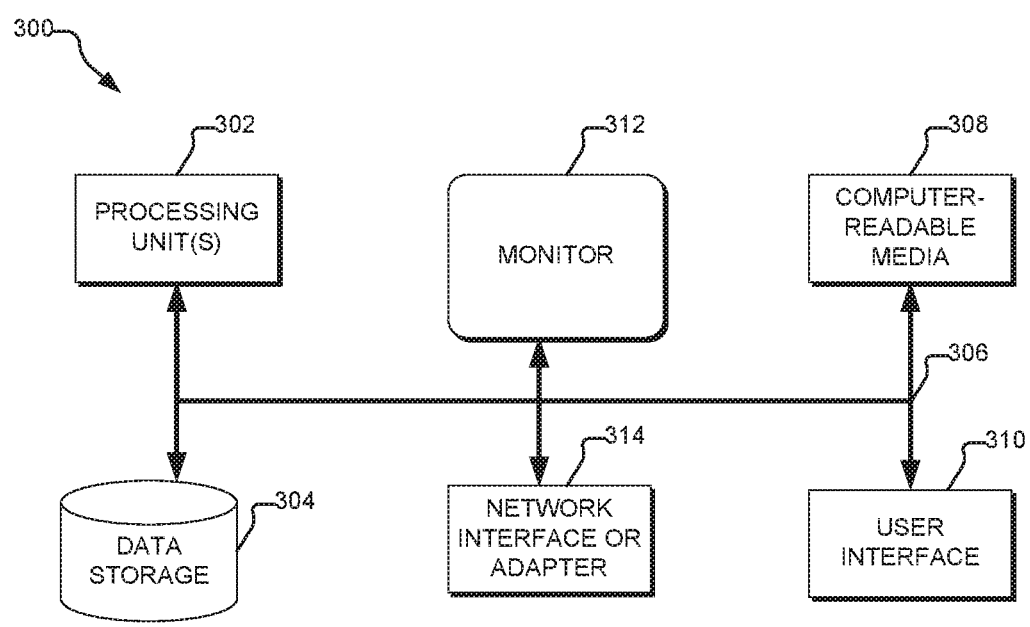
FIG. 3 is a block diagram illustrating a computing device for managing digital data maintained in a matrix, according to aspects of the present disclosure.

FIG. 3: Example of an 4×4 matrix with total no. of rows – 1 of single row parity and total no. of columns single parity.

$$A = \begin{bmatrix} d_1 & d_2 & d_3 & p_{r1} \\ d_4 & d_5 & d_6 & p_{r2} \\ p_{c1} & p_{c2} & p_{c3} & p_{c4} \\ q_{c1} & q_{c2} & q_{c3} & q_{c4} \end{bmatrix}$$

FIG. 4: Example of an 4×4 matrix with total no. of rows – 2 of single row parity and total no. of columns double parity.

As described above, the parity server nodes containing data volumes of parity data ensure fault tolerance across the entire matrix. The following example highlights an entire column and an entire row of failures:

$$A = \begin{bmatrix} d_1 & X & d_3 & p_{r1} \\ X & X & X & X \\ d_7 & X & d_9 & p_{r3} \\ p_{c1} & X & p_{c3} & p_{c4} \end{bmatrix}$$

FIG. 5: Example of an 4×4 matrix with total no. of rows – 1 of single row parity and total no. of columns single parity in degraded mode with 7 inaccessible or failed data volumes.

Referring again to FIG. 1, the processing device 102 functionally connects the matrix 104 with one or more client devices 136-142 to enable read and/or write requests to be performed at the various server data nodes 104-120 logically contained within the matrix 104. More specifically, the processing device 102 sends instructions to a management application 144 that executes the requests of the client devices 136-142 to obtain data from the matrix 104 from the appropriate data volumes of the server data nodes 104-120. A typical read operation may generate a data transfer request from one of the one or more client devices 104-110 to the processing device 102, which in turn, will obtain data from the matrix 104 based on the specific data instructions of the read request. When all data nodes within the matrix 104 are available, the processing device 102 reads data by accessing the data volume of the server data nodes 104-120 on which the requested data resides. When a data volume 104-120 fails, as will be further described below, the data on the failed data volume is reconstructed by performing one or more of the algorithms described above on the surviving server data nodes of the row and/or column for which the failed data volume exists.

Similar to a write request, a typical write operation may generate a data request from one of the one or more client devices 136-142 to the processing device 102, which in turn, will write data to the matrix 104 based on the write request. When all data nodes within the matrix 104 are available, the processing device 102 writes data to the desired drive by accessing the data volume of the server data nodes 104-120 on which the old data resides. The parity drive corresponding to the accessed data volume is read and, as will be further described below, one or more of the algorithms described above will be executed using the old data, the newly written data, and the old parity data to generate new parity data. Doing so ensures that the integrity of the parity server data node corresponding to the server data node accessed by the write request is maintained and any reconstruction of data can be performed if and when a data volume fails. When a data volume 104-120 fails, as will be further described below, the data on the failed data volume is reconstructed by performing one or more of the algorithms described above on the surviving server data nodes of the row and/or column for which the failed data volume exists.

Thus, the processing device 102 contains logic that automatically allows data to be transmitted to and from the one or more client devices 136-142 and logic that manages the data access activities of the matrix 104. The one or more client devices 136-142 may be any of, or any combination of, a personal computer; handheld computer; mobile phone; digital assistant; smart phone; server; application; and the like. In one embodiment, each of the one or more client devices 136-142 may include a processor-based platform that operates on any suitable operating system, such as Microsoft® Windows®, Linux®, and/or the like that is capable of executing software. Although FIG. 1 illustrates the data volumes being managed in a cluster and/or cloud computing/networked arrangement, it is contemplated that various aspects of the present disclosure may be performed in a local computing arrangement, such as within a single computing device or server data node. Thus, in some embodiments, the processing device 102 and all or portions of its functions may be locally maintained within each of the server data nodes 104-120 to generate and manage a fault tolerant matrix.

Referring now to FIG. 2 and with reference to FIG. 1, an illustrative process 200 for managing digital data in a fault tolerant matrix architecture is provided. As illustrated, process 200 begins with determining a type of request received to access data maintained in a fault tolerant matrix of server data nodes containing data volumes (operation 202). Referring again to FIG. 1, the processing device 102 receives a request from the one or more client devices 136-142 and determines whether the request is a read or write. Based upon the type of request, the processing device 102 transmits the request to the matrix 104 for execution and service.

Referring again to FIG. 2, if the request is a read request, the processing device determines whether the health of the matrix is considered good, failed, or degraded (operation 204). When the health of the matrix is considered good, the data is read from its respective data volume location located within the matrix (operation 206) and the read data is returned to the requesting process (operation 208). Referring to FIG. 1, the processing device 102 transmits the read request to the respective data node 104-120 of the matrix 104 capable of service the read request. In return, the respective data node 104-120 of the matrix 104 returns the data to the processing device 102, which in turn returns the data to the process requesting it at the one or more client devices 136-142. Referring back to FIG. 2, when the health of the matrix has failed, no data is returned and an error is generated—too many failures have occurred within the matrix causing the processing device 102 to realize a failure threshold has been satisfied, thereby indicating that no data should be written or read from the matrix (operation 209).

If the request is considered a read request and the health of the matrix is degraded, it is determined whether multiple data nodes (i.e., volumes within the nodes) have failed in a single row of the matrix (operation 210). If so (yes), erasure coding is applied to regenerate the requested, but inaccessible data, by reading the entire column of the matrix that includes the failed data volume maintaining the requested data and the data is re-stored at its original location within the data volume (operation 212). Referring to FIG. 1, the processing device 102 automatically applies vertical parity to the column to restore the data. Referring back to FIG. 2, once the failed volume has been restored, the requested data is returned to the requesting process (operation 208) as described above.

If multiple volumes have not failed, erasure coding is applied to regenerate the requested, but inaccessible data, by reading the entire row of the matrix that includes the failed data volume maintaining the requested data and the data is re-stored at its original location within the data volume (operation 214). Referring to FIG. 1, the processing device 102 automatically applies horizontal parity to the column to restore the data. Referring back to FIG. 2, once the failed volume has been restored, the requested data is returned to the requesting process (operation 208) as described above.

Referring again to FIG. 2, if the request is a write request, the processing device determines whether the health of the matrix is considered good, failed, or degraded (operation 216). When the health of the matrix has failed, no data is returned and an error is generated—too many failures have occurred within the matrix causing the processing device 102 to realize a failure threshold has been satisfied, thereby indicating that no data should be written or read from the matrix (operation 218).

If the request is considered a write request and the health of the matrix is degraded or good, erasure coding is applied to calculate new parity data for the entire column of the matrix that includes the failed data volume to which the requested data should be written (operation 220). Referring to FIG. 1, the processing device 102 automatically applies horizontal parity to the applicable column(s) to generate the parity data and write the data to the respective data volume. Referring again to FIG. 2, erasure coding is also applied to calculate new parity data for the entire row of the matrix that includes the failed data volume to which the requested data should be written (operation 222). Referring to FIG. 1, the processing device 102 automatically applies vertical parity to the applicable row(s) to generate the parity data and write the data to the respective data volume. Referring again to FIG. 2, the data is finally written to its appropriate location. If degraded, however, the missing locations will be omitted (operation 224).

FIG. 3 illustrates an example of a suitable computing and networking environment 300 that may be used to implement various aspects of the present disclosure described in FIGS. 1-2. As illustrated, the computing and networking environment 300 includes a general purpose computing device 300, although it is contemplated that the networking environment 300 may include one or more other computing systems, such as personal computers, server computers, hand-held or laptop devices, tablet devices, multiprocessor systems, microprocessor-based systems, set top boxes, programmable consumer electronic devices, network PCs, minicomputers, mainframe computers, digital signal processors, state machines, logic circuitries, distributed computing environments that include any of the above computing systems or devices, and the like.

Components of the computer 300 may include various hardware components, such as a processing unit 302, a data storage 304 (e.g., a system memory), and a system bus 306 that couples various system components of the computer 300 to the processing unit 302. The system bus 306 may be any of several types of bus structures including a memory bus or memory controller, a peripheral bus, and a local bus using any of a variety of bus architectures. For example, such architectures may include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 300 may further include a variety of computer-readable media 308 that includes removable/non-removable media and volatile/nonvolatile media, but excludes transitory propagated signals. Computer-readable media 308 may also include computer storage media and communication media. Computer storage media includes removable/non-removable media and volatile/nonvolatile media implemented in any method or technology for storage of information, such as computer-readable instructions, data structures, program modules or other data, such as RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium that may be used to store the desired information/data and which may be accessed by the computer 300.

Communication media includes computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. For example, communication media may include wired media such as a wired network or direct-wired connection and wireless media such as acoustic, RF, infrared, and/or other wireless media, or some combination thereof. Computer-readable media may be embodied as a computer program product, such as software stored on computer storage media.

The data storage or system memory 304 includes computer storage media in the form of volatile/nonvolatile memory such as read only memory (ROM) and random access memory (RAM). A basic input/output system (BIOS), containing the basic routines that help to transfer information between elements within the computer 300 (e.g., during start-up) is typically stored in ROM. RAM typically contains data and/or program modules that are immediately accessible to and/or presently being operated on by processing unit 302. For example, in one embodiment, data storage 304 holds an operating system, application programs, and other program modules and program data.

Data storage 304 may also include other removable/non-removable, volatile/nonvolatile computer storage media. For example, data storage 304 may be: a hard disk drive that reads from or writes to non-removable, nonvolatile magnetic media; a magnetic disk drive that reads from or writes to a removable, nonvolatile magnetic disk; and/or an optical disk drive that reads from or writes to a removable, nonvolatile optical disk such as a CD-ROM or other optical media. Other removable/non-removable, volatile/nonvolatile computer storage media may include magnetic tape cassettes, flash memory cards, digital versatile disks, digital video tape, solid state RAM, solid state ROM, and the like. The drives and their associated computer storage media, described above and illustrated in FIG. 3, provide storage of computer-readable instructions, data structures, program modules and other data for the computer 300.

A user may enter commands and information through a user interface 310 or other input devices such as a tablet, electronic digitizer, a microphone, keyboard, and/or pointing device, commonly referred to as mouse, trackball or touch pad. Other input devices may include a joystick, game pad, satellite dish, scanner, or the like. Additionally, voice inputs, gesture inputs (e.g., via hands or fingers), or other natural user interfaces may also be used with the appropriate input devices, such as a microphone, camera, tablet, touch pad, glove, or other sensor. These and other input devices are often connected to the processing unit 302 through a user interface 310 that is coupled to the system bus 306, but may be connected by other interface and bus structures, such as a parallel port, game port or a universal serial bus (USB). A monitor 312 or other type of display device is also connected to the system bus 306 via an interface, such as a video interface. The monitor 312 may also be integrated with a touch-screen panel or the like.

The computer 300 may operate in a networked or cloud-computing environment using logical connections of a network interface or adapter 314 to one or more remote devices, such as a remote computer. The remote computer may be a personal computer, a server, a router, a network PC, a peer device or other common network node, and typically includes many or all of the elements described above relative to the computer 300. The logical connections depicted in FIG. 3 include one or more local area networks (LAN) and one or more wide area networks (WAN), but may also include other networks. Such networking environments are commonplace in offices, enterprise-wide computer networks, intranets and the Internet.

When used in a networked or cloud-computing environment, the computer 300 may be connected to a public and/or private network through the network interface or adapter 314. In such embodiments, a modem or other means for establishing communications over the network is connected to the system bus 306 via the network interface or adapter 314 or other appropriate mechanism. A wireless networking component including an interface and antenna may be coupled through a suitable device such as an access point or peer computer to a network. In a networked environment, program modules depicted relative to the computer 300, or portions thereof, may be stored in the remote memory storage device.

The foregoing merely illustrates the principles of the disclosure. Various modifications and alterations to the described embodiments will be apparent to those skilled in the art in view of the teachings herein. It will thus be appreciated that those skilled in the art will be able to devise numerous systems, arrangements and methods which, although not explicitly shown or described herein, embody the principles of the disclosure and are thus within the spirit and scope of the present disclosure. From the above description and drawings, it will be understood by those of ordinary skill in the art that the particular embodiments shown and described are for purposes of illustrations only and are not intended to limit the scope of the present disclosure. References to details of particular embodiments are not intended to limit the scope of the disclosure.

What is claimed is:

1. A system for generating a fault tolerant matrix comprising:
   a cluster of computing nodes distributed throughout a communications network, respective computing nodes of the cluster of computing nodes storing a plurality of data volumes logically arranged in a matrix structure, wherein the matrix structure is implemented, according to a fault tolerant design pattern, on at least two data volumes of the plurality of data volumes, the first data volume being different than the second data volume;
   a processing device in operable communication with at least one computing node of the cluster of computing nodes to:
      receive a request requesting access to data stored in a particular data volume of the plurality of data volumes arranged in the matrix; and
      determine whether the matrix is degraded; and
   when the data volume is degraded, execute erasure coding algorithms to regenerate the data, based on a row of the matrix in which the data volume is maintained.

2. The system of claim 1, wherein to execute erasure coding algorithms based on a row comprises:
   when the request is a read request, determining whether at least two of the data volumes of the plurality of volumes have failed in a single row of the matrix;
   when two of the data volumes of the plurality of data volumes have failed in a single row of the matrix, execute erasure coding algorithms to regenerate the data, based on portions of data included in all data volumes of the column of the matrix in which the particular data volume is maintained.

3. The system of claim 1, wherein to execute erasure coding algorithms based on a row comprises:

when the request is a read request, determining whether one of the data volumes of the plurality of volumes has failed in a single row of the matrix;
when one of the data volumes of the plurality of data volumes has failed in a single row, execute erasure coding algorithms to regenerate the data, based on portions of data included in all data volumes of the row of the matrix in which the particular data volume is maintained.

4. The system of claim 1, wherein to execute erasure coding algorithms based on a row comprises:
when the request is a write request:
execute erasure coding algorithms to calculate new parity data, based on portions of data included in all data volumes of the row of the matrix in which the particular data volume is maintained;
execute erasure coding algorithms to calculate new parity data, based on portions of data included in all data volumes of the column of the matrix in which the particular data volume is maintained.

5. The system of claim 1, wherein the at least one processor is further configured to: determine whether a data volume of the plurality of data volumes has failed; and when the data volume has failed, generate an error.

6. The system of claim 1, further comprising increasing the size of the matrix, and thereby reducing a number of parity drives required to be maintained in the matrix.

7. A method for generating a fault tolerant matrix comprising:
receiving a request requesting access to data stored in a particular data volume of a plurality of data volumes arranged in a matrix structure, the matrix structure is implemented, according to a fault tolerant design pattern, on at least two data volumes of the plurality of data volumes, the first data volume being different than the second data volume, the plurality of data volumes stored by respective computing nodes of a cluster of computing nodes distributed throughout a communications network;
determining whether the matrix is degraded; and
when the data volume is degraded, executing erasure coding algorithms to regenerate the data, based on a row of the matrix in which the data volume is maintained.

8. The method of claim 7, wherein to execute erasure coding algorithms based on a row comprises:
when the request is a read request, determining whether at least two of the data volumes of the plurality of volumes have failed in a single row of the matrix;
when two of the data volumes of the plurality of data volumes have failed in a single row of the matrix, execute erasure coding algorithms to regenerate the data, based on portions of data included in all data volumes of the column of the matrix in which the particular data volume is maintained.

9. The method of claim 7, wherein to execute erasure coding algorithms based on a row comprises:
when the request is a read request, determining whether one of the data volumes of the plurality of volumes has failed in a single row of the matrix;
when one of the data volumes of the plurality of data volumes has failed in a single row, execute erasure coding algorithms to regenerate the data, based on portions of data included in all data volumes of the row of the matrix in which the particular data volume is maintained.

10. The method of claim 7, wherein to execute erasure coding algorithms based on a row comprises:
when the request is a write request,
execute erasure coding algorithms to calculate new parity data, based on portions of data included in all data volumes of the row of the matrix in which the particular data volume is maintained;
execute erasure coding algorithms to calculate new parity data, based on portions of data included in all data volumes of the column of the matrix in which the particular data volume is maintained.

11. The method of claim 7, wherein the at least one processor is further configured to: determine whether a data volume of the plurality of data volumes has failed; and when the data volume has failed, generate an error.

12. The method of claim 7, further comprising increasing the size of the matrix, and thereby reducing a number of parity drives required to be maintained in the matrix.

13. A non-transitory computer readable medium encoded with instructions for generating a fault tolerant matrix, the instructions executable by one or more computing devices, comprising:
receiving a request requesting access to data stored in a particular data volume of a plurality of data volumes arranged in a matrix structure, the matrix structure implemented, according to a fault tolerant design pattern on at least two data volumes of the plurality of data volumes, the first data volume being different than the second data volume, the plurality of data volumes stored by respective computing nodes of a cluster of computing nodes distributed throughout a communications network;
determining whether the matrix is degraded; and
when the data volume is degraded, executing erasure coding algorithms to regenerate the data, based on a row of the matrix in which the data volume is maintained.

14. The non-transitory computer readable medium of claim 13, wherein to execute erasure coding algorithms based on a row comprises:
when the request is a read request, determining whether at least two of the data volumes of the plurality of volumes have failed in a single row of the matrix;
when two of the data volumes of the plurality of data volumes have failed in a single row of the matrix, execute erasure coding algorithms to regenerate the data, based on portions of data included in all data volumes of the column of the matrix in which the particular data volume is maintained.

15. The non-transitory computer readable medium of claim 13, wherein to execute erasure coding algorithms based on a row comprises:
when the request is a read request, determining whether one of the data volumes of the plurality of volumes has failed in a single row of the matrix;
when one of the data volumes of the plurality of data volumes has failed in a single row, execute erasure coding algorithms to regenerate the data, based on portions of data included in all data volumes of the row of the matrix in which the particular data volume is maintained.

16. The non-transitory computer readable medium of claim 13, wherein to execute erasure coding algorithms based on a row comprises when the request is a write request:
execute erasure coding algorithms to calculate new parity data, based on portions of data included in all data volumes of the row of the matrix in which the particular data volume is maintained;

execute erasure coding algorithms to calculate new parity data, based on portions of data included in all data volumes of the column of the matrix in which the particular data volume is maintained.

17. The non-transitory computer readable medium of claim 13, further comprising increasing the size of the matrix, and thereby reducing a number of parity drives required to be maintained in the matrix.

18. The non-transitory computer readable medium of claim 13, further comprising increasing the size of the matrix, and thereby reducing a number of parity drives required to be maintained in the matrix.

* * * * *